Patented Mar. 20, 1951

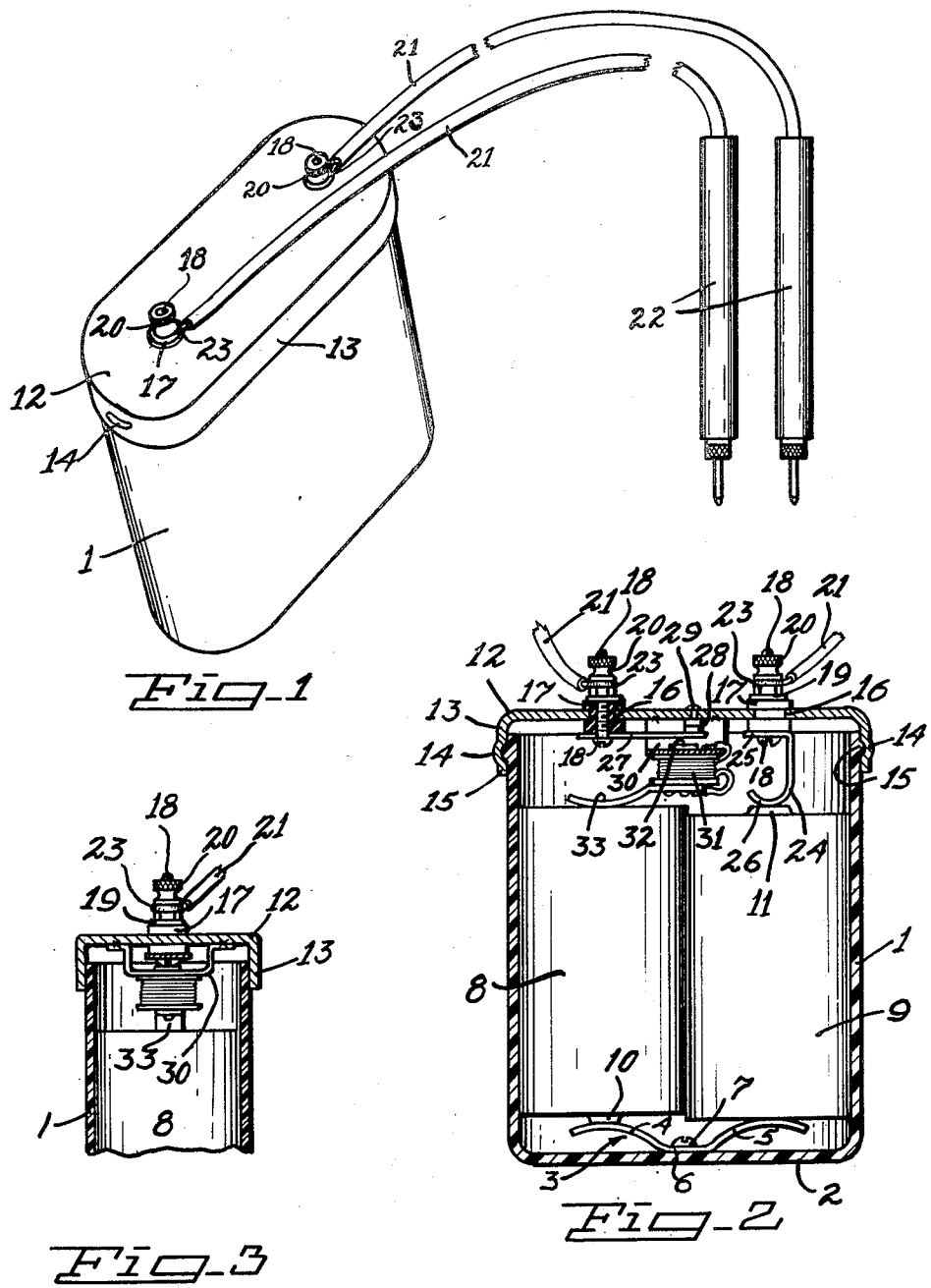

2,545,808

UNITED STATES PATENT OFFICE 2,545,808

CIRCUIT TESTER

Robert J. Du Pree, Waitsburg, Wash.

Application October 17, 1949, Serial No. 121,738

2 Claims. (Cl. 175—183)

This invention relates to a circuit tester and more particularly to a device by means of which tests may be made in order to locate a fuse which has been blown out or is otherwise defective.

When an electric fuse is blown and it is one of a number of fuses in a fuse box it is difficult to determine which fuse has been burned out by merely looking at them and it is therefore one object of the invention to provide a tester which may be applied to fuses and will very effectively indicate if a fuse is in good condition by emitting audible signal if the fuse is not burned out.

Another object of the invention is to provide a tester wherein the audible signal and batteries for energizing the same are housed in a casing where they will be protected from damage.

Another object of the invention is to provide a tester having the signal carried by a cover for a casing in which the batteries are mounted, there being terminal posts which are mounted through the cover so that the wires of testing prods may be connected with outer ends of the posts and tests by applying the prods to a fuse.

Another object of the invention is to provide a tester including a casing formed of insulating material and having at its bottom a bridging contact serving to connect batteries in series when the batteries are placed in the casing with one battery upright and the other in an inverted position.

Another object of the invention is to provide a tester which is compact and with which batteries of the type used in flashlights may be used for energizing the signal of the tester.

With these and other objects in view a practical embodiment of the invention is illustrated in the accompanying drawings wherein:

Fig. 1 is a perspective view of the improved tester.

Fig. 2 is a sectional view taken vertically through the tester.

Fig. 3 is a fragmentary sectional view taken transversely of Figure 2.

The casing 1 of this improved tester is formed of insulating material and is open at its top. The bottom 2 of the casing is flat and upon this bottom is mounted a bridging contact 3 which is formed from a strip of resilient sheet metal. The metal strip is bent to form longitudinally curved arms 4 and 5 which extend from opposite ends of a bridge 6 and are spaced upwardly from the bottom of the casing. A fastener 7 which passes through the bridge firmly secures the contact to the bottom of the casing and holds it in such a position that its arms extend longitudinally of the bottom. The casing is of such dimensions that it will accommodate two batteries 8 and 9 of the flashlight type, and upon referring to Figure 2, it will be seen that the battery 8 is in an inverted position with its center positive pole 10 resting upon one arm of the contact 3 while the battery 9 is upright and has its center pole 11 presented upwardly and the bottom of its shell resting upon the other arm of the bridging contact. Therefore the bridging contact connects the batteries in series.

The open top of the casing 1 is closed by a cover or cap 12 which is formed of metal and has a depending marginal flange 13 which fits tightly about the walls of the casing and has portions pressed outwardly to form internal depressions or pockets 14 into which fit beads 15 projecting outwardly from the casing. Since the beads are rounded in cross section and the depressions or cavities are of similar shape the cover may be readily applied or removed but engagement of the beads in the depressions will firmly hold the cover in place and prevent it from accidentally becoming detached.

Openings 16 are formed through the cover above the batteries and through these openings are fitted bushings 17 which are formed of insulation and bored longitudinally to receive terminal posts or bolts 18 having their heads at their lower ends. The bolts project upwardly from the bushings and carry metal washers 19 which are threaded upon the bolts and also carry thumb screws 20. The insulated wires 21 of the testing prods 22 may therefore have their attaching terminals 23 applied to the bolts between the washers and the thumb screws and firmly secured when the said thumb screws are tightened. At its inner end one of the terminal posts carries a contact 24 which is formed from a strip of resilient metal having one end bent to form an arm 25 through which the bolt passes, the other, or lower end portion of the contact strip being bent to form a longitudinally curved bill or foot 26 which bears upon the center pole of the upright battery 9 when the cover is in place upon the casing. The other terminal post or bolt carries a vibrator arm 27 which is held firmly against the bushing of this post and projects laterally therefrom. At its free end the vibrator arm carries an upwardly projecting point 28 normally held against a companion point 29 carried by the cover. A yoke or bracket 30 which is substantially U-shaped has its arms secured against the under face of the cover. This bracket extends transversely of the cover and straddles the vibrator arm and has such spaced relation to the vibrator arm that this arm has plenty of room to vibrate vertically and cause its vibrator point to move into and out of engagement with the companion point carried by the cover and create a buzzing noise. Movement is imparted to the vibrator arm by means of an electro-magnet 31 which is disposed under the bracket and supported therefrom by its core 32 which is mounted through the bracket and has one upper end of its coil connected with the bracket and the lower end thereof connected with a contact arm 33. The contact 33 is formed from a strip of resilient metal and has its inner end portion secured against the electromagnet and its portion which projects laterally from the magnet bowed longitudinally in a downward direction so that it will have close contacting engagement with the bottom of the inverted battery 8 when the cover is in place upon the casing.

When this tester is in use batteries are fitted into the casing and the cover applied. The wires 21 of the prods 22 are connected with outer ends of the terminal posts 18. The casing is of such size that it may be placed in a pocket or it may be connected with a belt or set at rest upon a convenient support. The prods are applied to positive and negative parts of a fuse plug to be tested and if the fuse is in working condition current will flow through the tester and energize the electro-magnet. This will cause the vibrator arm to vibrate and a buzzing noise will be created. If the fuse plug is burned out the circuit will be broken and no buzzing noise will be created. This will indicate that the fuse plug is defective and needs to be replaced with a good plug. A number of fuse plugs in a fuse box may thus be easily and quickly tested and defective plugs accurately located.

I claim:

1. A circuit tester comprising a casing formed of insulation and open at its top, a metal cover removably applied to said casing, a bridging contact in the casing, said contact consisting of a strip of resilient metal secured midway its length against the inner surface of the bottom of the casing and having its end portions bowed upwardly and forming longitudinally curved resilient contact arms spaced from the bottom, batteries disposed in said casing in side by side relation to each other, one battery having the bottom of the shell resting upon one arm of the bridging contact and its center position pole presented upwardly, the other battery having its center pole presented downwardly and resting upon the other arm of the bridging contact, terminal posts mounted through said cover and insulated therefrom, a resilient contact arm extending downwardly from the inner end of one of said posts and having its lower end portion bent laterally and forming a longitudinally curved terminal portion bearing upon the center pole of the first battery, a resilient vibrator arm extending laterally from the inner end of the second post and having a vibrator point at its free end, a vibrator point carried by said cover over the vibrator point of said vibrator arm, a substantially U-shaped bracket mounted against the inner face of said cover and straddling the vibrator arm and the vibrator points, a magnetic coil carried by and extending downwardly from said bracket in cooperating relation to said vibrator arm, a resilient arm extending laterally from the lower end of said coil and having a downwardly bowed portion bearing upon the upwardly presented end of the casing of the second battery, and insulated wires connected with outer ends of said terminal posts and carrying testing prods at their outer ends.

2. A circuit tester comprising a casing, a removable cover for said casing, an insulated bridging contact within the casing secured upon the bottom of said casing, batteries in said casing, one battery being upright and resting upon a portion of said bridging contact with its center pole presented upwardly and the other battery being inverted and having its center pole resting upon another portion of the bridging contact, insulated terminal posts mounted through said cover, a resilient contact arm carried by the inner end of one terminal post and extending downwardly therefrom and having a laterally extending free end portion bearing upon the center pole of the upright battery, a vibrator arm carried by and extending laterally from the inner end of the second terminal post and carrying an upwardly presented vibrator point at its free end, a vibrator point carried by said cover disposed over the vibrator point of said vibrator arm, a bracket carried by said cover and straddling said vibrator arm, a coil extending downwardly from said bracket under the free end thereof, and a resilient contact arm extending laterally from the lower end of said coil and bearing upon the upwardly presented bottom of the inverted battery.

ROBERT J. DU PREE.

REFERENCES CITED

The following references are of record in the file of this patent:

UNITED STATES PATENTS

| Number | Name | Date |
|---|---|---|
| 925,412 | Addie | June 15, 1909 |
| 968,448 | Cary | Aug. 23, 1910 |
| 1,433,264 | Fahlenberg | Oct. 24, 1922 |
| 2,457,869 | Clemens | Jan. 4, 1949 |